United States Patent
Amacker

(10) Patent No.: US 10,885,776 B2
(45) Date of Patent: Jan. 5, 2021

(54) SYSTEM AND METHOD FOR ROADWAY CONTEXT LEARNING BY INFRASTRUCTURE SENSORS

(71) Applicant: Toyota Research Institute, Inc., Los Altos, CA (US)

(72) Inventor: Matthew Amacker, Santa Clara, CA (US)

(73) Assignee: Toyota Research Institute, Inc., Los Alios (CA)

(*) Notice: Subject to any disclaimer, the term of this patent is extended or adjusted under 35 U.S.C. 154(b) by 0 days.

(21) Appl. No.: 16/157,371

(22) Filed: Oct. 11, 2018

(65) Prior Publication Data

US 2020/0118425 A1    Apr. 16, 2020

(51) Int. Cl.
| | | |
|---|---|---|
| *G08G 1/01* | (2006.01) | |
| *H04W 4/44* | (2018.01) | |
| *G08G 1/16* | (2006.01) | |

(52) U.S. Cl.
CPC ......... *G08G 1/0137* (2013.01); *G08G 1/0112* (2013.01); *G08G 1/0116* (2013.01); *G08G 1/0129* (2013.01); *G08G 1/0133* (2013.01); *G08G 1/164* (2013.01); *G08G 1/165* (2013.01); *G08G 1/166* (2013.01); *G08G 1/167* (2013.01); *H04W 4/44* (2018.02)

(58) Field of Classification Search
None
See application file for complete search history.

(56) References Cited

U.S. PATENT DOCUMENTS

| | | | |
|---|---|---|---|
| 7,791,503 B2 | 9/2010 | Breed et al. | |
| 8,849,554 B2 | 9/2014 | Aubrey et al. | |
| 9,472,097 B2* | 10/2016 | Stelzig | G08G 1/0116 |
| 9,633,560 B1 | 4/2017 | Gao et al. | |
| 10,293,818 B2* | 5/2019 | Kroop | B60W 30/09 |
| 10,325,491 B1* | 6/2019 | Fields | G08G 1/096791 |
| 10,362,461 B2* | 7/2019 | Stitt | H04W 4/70 |
| 2009/0261978 A1* | 10/2009 | Lee | H04L 12/2803 340/573.1 |
| 2014/0200863 A1* | 7/2014 | Kamat | G01C 15/00 703/1 |
| 2016/0210853 A1 | 7/2016 | Koravadi | |
| 2016/0286629 A1* | 9/2016 | Chen | H05B 37/0272 |
| 2017/0166123 A1* | 6/2017 | Bahgat | B60W 50/0097 |
| 2017/0206783 A1 | 7/2017 | Miller | |
| 2017/0248437 A1* | 8/2017 | Thompson | G01C 21/3602 |

(Continued)

*Primary Examiner* — Steven Lim
*Assistant Examiner* — Muhammad Adnan
(74) *Attorney, Agent, or Firm* — Christopher G. Darrow; Darrow Mustafa PC

(57) ABSTRACT

System, methods, and other embodiments described herein relate to providing contextual awareness about a roadway segment from an infrastructure device. In one embodiment, a method includes, in response to receiving a context request from a nearby vehicle, acquiring sensor data from at least one infrastructure sensor associated with the roadway segment. The method includes analyzing the sensor data to produce a roadway context by executing a learning module over the sensor data. The roadway context is a characterization of a current state of the roadway segment. The method includes communicating the roadway context to the nearby vehicle to improve a situational awareness of the nearby vehicle about the roadway segment.

20 Claims, 6 Drawing Sheets

(56) References Cited

U.S. PATENT DOCUMENTS

| | | | |
|---|---|---|---|
| 2018/0136000 A1* | 5/2018 | Rasmusson, Jr. | G01C 21/3638 |
| 2018/0173240 A1* | 6/2018 | Fang | G05D 1/0221 |
| 2018/0251128 A1* | 9/2018 | Penilla | B60W 30/09 |
| 2018/0257661 A1* | 9/2018 | Kroop | B60W 50/0098 |
| 2019/0025843 A1* | 1/2019 | Wilkinson | G05D 1/0212 |
| 2019/0049993 A1* | 2/2019 | Baskaran | G05D 1/0276 |
| 2019/0050692 A1* | 2/2019 | Sharma | G06K 9/6292 |
| 2019/0095725 A1* | 3/2019 | Kalghatgi | B61L 3/008 |
| 2019/0221116 A1* | 7/2019 | Powch | G08G 1/0112 |
| 2019/0287403 A1* | 9/2019 | Aoude | G06N 20/00 |
| 2019/0378414 A1* | 12/2019 | Pari | G08G 1/005 |

\* cited by examiner

SYSTEM AND METHOD FOR ROADWAY CONTEXT LEARNING BY INFRASTRUCTURE SENSORS

TECHNICAL FIELD

The subject matter described herein relates, in general, to a system and method for providing contextual awareness to nearby vehicles at a roadway segment, and, more particularly, to infrastructure devices that learn a roadway context for the roadway segment and communicate the roadway context to the nearby vehicles.

BACKGROUND

Vehicles may be equipped with sensors that facilitate perceiving other vehicles, obstacles, pedestrians, and additional aspects of a surrounding environment. For example, a vehicle may be equipped with a light detection and ranging (LIDAR) sensor that uses light to scan the surrounding environment, while further processing elements associated with the LIDAR analyze acquired data to detect a presence of objects and other features of the surrounding environment. In further examples, additional/alternative sensors such as cameras may be implemented to acquire additional sensor data about the surrounding environment from which a system derives a contextual awareness about aspects of the surrounding environment. The sensor data can be useful in various circumstances for improving perceptions of the surrounding environment so that systems such as autonomous driving systems can perceive the noted aspects and accurately plan and navigate accordingly.

In general, the further awareness is developed by the vehicle about a surrounding environment, the better a driver can be supplemented with information to assist in driving and/or the better an autonomous system can control the vehicle to avoid hazards. However, because the sensors of the vehicle acquire the sensor data through a limited perspective (e.g., at road-level) and for a constrained time period when approaching a road segment (e.g., intersection, merge, etc.), the ability to develop a comprehensive assessment of aspects relating to the road segment may be difficult.

That is, the vehicle may encounter multiple difficulties when generating a contextual assessment of the road segment. In general, the difficulties relate to how the vehicle approaches the road segment. First, the limited perspective from which the vehicle acquires the sensor data (e.g., approaching from a single direction and at a limited height) generally constrains the available information embodied with the sensor data, and a short time to acquire the sensor data can further constrain the acquired sensor data. Moreover, because the vehicle is moving when acquiring and processing the sensor data, the vehicle has limited time to process the sensor data when approaching the road segment. Therefore, the vehicle may implement tradeoffs between speed and accuracy of generated determinations due to limited computational time. Additionally, the vehicle itself may have limited computing resources and thus may self-limit the processing that is performed to produce the contextual assessment. In any case, the vehicle may encounter difficulties when perceiving aspects of the surrounding environment because of the noted issues and as a result may not develop a comprehensive contextual awareness of the road segment.

SUMMARY

In one embodiment, example systems and methods relate to an infrastructure-based device that improves contextual awareness of oncoming vehicles by communicating contextual aspects of a roadway segment to the oncoming vehicles. The disclosed approach exploits the ability of stationary devices positioned at a particular roadway segment to develop a contextual understanding about the roadway segment over many observations. That is, in one embodiment, an infrastructure system includes one or more sensors that acquire sensor data about the roadway segment. However, because the sensors are fixed at the roadway segment, the particular sensor(s) can be positioned to have an improved perspective, can be calibrated to provide an improved quality of data, and generally produce the sensor data in a more robust manner than what is generally available in a vehicle approaching the roadway segment.

Moreover, the infrastructure system can learn from many observations of the roadway segment over time using the associated sensors. That is, because the infrastructure system is "always on" and observing the roadway segment, the infrastructure system can process many observations of the whole roadway segment. Accordingly, the infrastructure system can develop a learned understanding of static aspects of the infrastructure including which aspects are truly static, which aspects may change intermittently, and so on. Additionally, the infrastructure system can further develop a learned understanding of dynamic objects and behaviors of the dynamic objects in order to understand possible outcomes of different occurrences involving the dynamic objects through the roadway segment. Consequently, because the infrastructure system is able to accumulate knowledge about the roadway segment over many observations, the infrastructure system can develop a better understanding of aspects relating to the roadway segment and communicate this knowledge to facilitate contextual awareness by other entities.

As such, when a vehicle approaches the roadway segment, the infrastructure system, in one aspect, initiates communications with the vehicle and provides a roadway context to the vehicle that embodies the learned understanding of the roadway segment over the many observations. The roadway context indicates aspects about the static infrastructure of the roadway segment in addition to dynamic aspects such as dynamic objects that are currently present and possible hazards associated therewith. Thus, the infrastructure system, in one aspect, pre-packages a deep understanding of the roadway segment that is provided to the vehicle in order to improve the knowledge of the vehicle about the roadway segment and thereby improve the contextual awareness of the vehicle while also lessening computational resources consumed by the vehicle to achieve such an understanding. In this way, the infrastructure system avoids the noted difficulties and improves the functioning of the vehicle (either autonomously or through informing the driver) by ensuring the vehicle is aware of aspects relating to a current configuration of the roadway segment.

In one embodiment, an infrastructure system for providing contextual awareness about a roadway segment from an infrastructure device is disclosed. The infrastructure system includes one or more processors and a memory communicably coupled to the one or more processors. The memory stores an acquisition module including instructions that when executed by the one or more processors cause the one or more processors to, in response to receiving a context request from a nearby vehicle, acquire sensor data from at least one infrastructure sensor associated with the roadway segment. The memory further stores a context module including instructions that when executed by the one or more processors cause the one or more processors to analyze the sensor data to produce a roadway context by executing a learning module over the sensor data. The roadway context is a characterization of a current state of the roadway segment. The context module includes instructions to communicate the roadway context to the nearby vehicle to improve a situational awareness of the nearby vehicle about the roadway segment.

In one embodiment, a non-transitory computer-readable medium for providing contextual awareness about a roadway segment from an infrastructure device and including instructions that when executed by one or more processors cause the one or more processors to perform one or more functions is disclosed. The instructions include instructions to, in response to receiving a context request from a nearby vehicle, acquire sensor data from at least one infrastructure sensor associated with the roadway segment. The instructions include instructions to analyze the sensor data to produce a roadway context by executing a learning module over the sensor data. The roadway context is a characterization of a current state of the roadway segment. The instructions include instructions to communicate the roadway context to the nearby vehicle to improve a situational awareness of the nearby vehicle about the roadway segment.

In one embodiment, a method for providing contextual awareness about a roadway segment from an infrastructure device is disclosed. In one embodiment, the method includes, in response to receiving a context request from a nearby vehicle, acquiring sensor data from at least one infrastructure sensor associated with the roadway segment. The method includes analyzing the sensor data to produce a roadway context by executing a learning module over the sensor data. The roadway context is a characterization of a current state of the roadway segment. The method includes communicating the roadway context to the nearby vehicle to improve a situational awareness of the nearby vehicle about the roadway segment.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
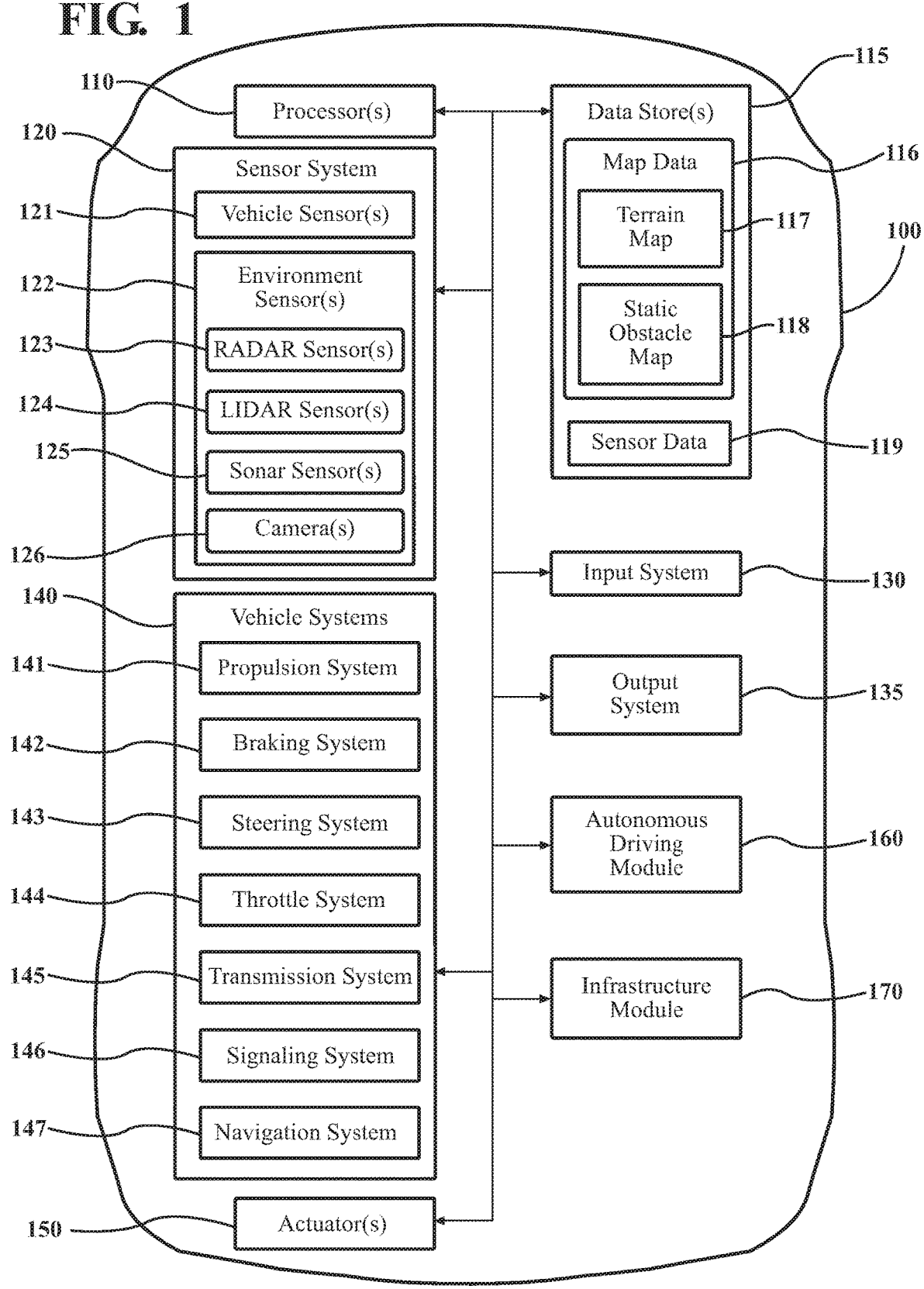
FIG. 1 illustrates one embodiment of a vehicle within which systems and methods disclosed herein may be implemented.

Systems, methods, and other embodiments associated with a manner of generating and communicating a roadway context to approaching vehicles of a roadway segment are disclosed. As mentioned previously, a vehicle may include multiple sensors for perceiving aspects of the surrounding environment in order to develop an awareness about obstacles, hazards, navigation indicators, road boundaries, and so on so that the vehicle may at least provide additional functionality to vehicle systems to improve operation over the roadway segment. However, in general, difficulties can arise with accurately generating determinations from the sensor data due to intrinsic difficulties with acquiring a comprehensive observation of the roadway segment using sensor data from the vehicle alone. Moreover, as previously indicated, time and computational resources for producing the contextual awareness may be limited due to the movement of the vehicle and the available resources of the vehicle itself.

Therefore, in one embodiment, example systems and methods relate to an infrastructure-based device that improves contextual awareness of vehicles by communicating perceived aspects of a roadway segment to the vehicles. The disclosed approach leverages stationary devices positioned at a respective roadway segment to learn the particularities of the roadway segments through observing dynamic and static aspects of the roadway segment throughout time. That is, in one embodiment, an infrastructure system includes one or more sensors that acquire sensor data about the roadway segment. The sensors can include cameras, LiDAR, and other types of sensors that facilitate generating a comprehensive observation of the roadway segment. Moreover, because the sensors are fixed at the roadway segment, the particular sensor(s) can be positioned to have an improved perspective, can be calibrated to provide an improved quality of data, can be of a higher fidelity that sensors within, for example, a vehicle, and generally produce the sensor data in a more robust manner than what is otherwise available.

The infrastructure system uses the observations of the roadway segment to learn and better understand which aspects are static vs. dynamic, what behaviors are irregular for dynamic objects and potentially represent hazards, and so on. Because the infrastructure system is always observing the roadway segment in contrast to ephemeral observations of a vehicle passing through the roadway segment, the infrastructure system can process many observations to develop a learned understanding of the roadway segment. The learned understanding can include improved awareness of static aspects of the infrastructure including which aspects are truly static, which aspects may change intermittently (e.g., construction, temporary maintenance, weather, etc.), and so on. Additionally, the infrastructure system can further develop a learned understanding of dynamic objects and behaviors of the dynamic objects in relation to the roadway segment. Learning the behaviors of the dynamic objects provides the infrastructure system with insights about possible outcomes of different occurrences (e.g., different trajectories) involving the dynamic objects and interactions between the dynamic objects through the roadway segment (e.g., common accidents, congestion, etc.). Consequently, because the infrastructure system is able to accumulate knowledge about the roadway segment over many observations, the infrastructure system is able to communicate an improved contextual awareness produced from the learned understanding to vehicles traveling through the roadway segment to facilitate improved understanding by the vehicles.

As such, when a vehicle approaches the roadway segment, the infrastructure system, in one aspect, communicates with the vehicle and provides a roadway context to the vehicle that embodies the learned understanding for a current arrangement of circumstances. The roadway context indicates aspects about the static infrastructure (e.g., static background) of the roadway segment in addition to dynamic aspects such as possible hazards from pedestrians, vehicles, etc. In this way, the infrastructure system avoids the noted difficulties and improves the functioning of the vehicle (either autonomously or through informing the driver) in relation to the operation of the vehicle through the roadway segment.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, proceeds through an environment according to assessed aspects of the environment, and thus benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

Figure 2:
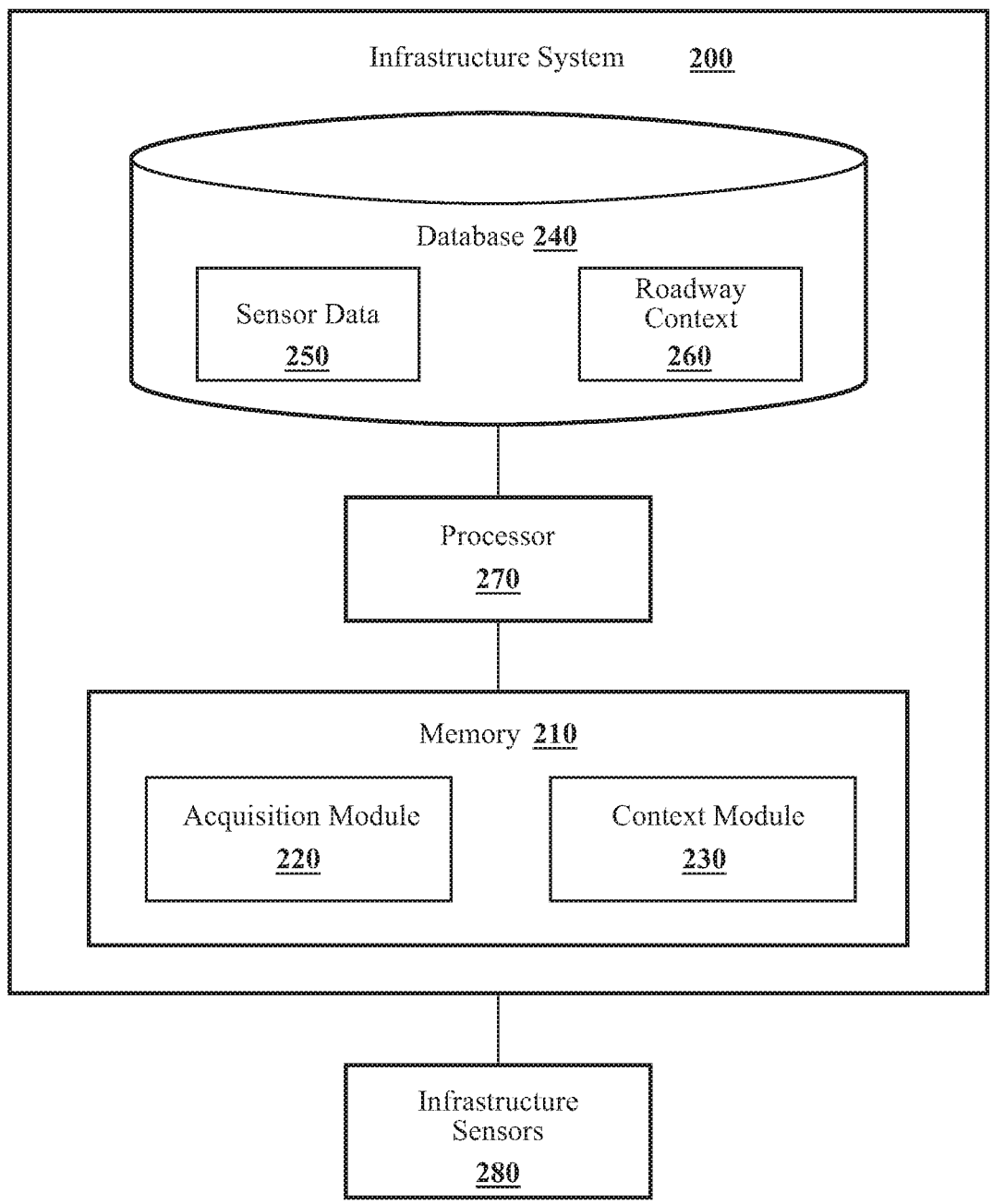
FIG. 2 illustrates one embodiment of an infrastructure system that is associated with learning dynamic and static aspects of a roadway segment from infrastructure sensors.

In either case, the vehicle 100 includes an infrastructure module 170 implemented to operate in conjunction with an infrastructure system 200, illustrated in FIG. 2, as implemented at various roadway segments as infrastructure devices. That is, as illustrated in FIG. 1, the infrastructure module 170 may include functions to facilitate communications with the infrastructure system 200 and to process information (e.g., roadway context) received from the infrastructure system 200. In either case, the infrastructure module 170 of the vehicle 100 along with the infrastructure system 200 generally operate cooperatively to provide information to the vehicle 100 and various sub-systems thereof (e.g., autonomous driving module 160). For example, the infrastructure system 200 generally performs methods and other functions as disclosed herein relating to analyzing sensor data about a roadway segment to produce a roadway context indicating a current configuration of both static and dynamic aspects. Thus, the infrastructure module 170 functions to receive the roadway context and translate the roadway context into a form that is usable by various aspects of the vehicle 100. The noted functions and methods will become more apparent with a further discussion of the figures.

With reference to FIG. 2, one embodiment of an infrastructure system 200 is further illustrated. The infrastructure system 200 is shown as including a processor 270. Accordingly, the processor 270 may be a part of the infrastructure system 200, or the infrastructure system 200 may access the processor 270 through a data bus or another communication path. In one or more embodiments, the processor 270 is an application specific integrated circuit that is configured to implement functions associated with an acquisition module 220 and a context module 230. In general, the processor 270 is an electronic processor such as a microprocessor that is capable of performing various functions as described herein.

In one embodiment, the infrastructure system 200 includes a memory 210 that stores the acquisition module 220 and a context module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, the acquisition module 220 generally includes instructions that function to control the processor 270 to receive data inputs from infrastructure sensors 280. The present discussion will focus on a particular set of sensors (e.g., the LiDAR and the camera); however, it should be appreciated that the disclosed approach can be extended to cover further configurations of sensors such as multiple LiDAR sensors with one or more cameras, different types of LiDARs and cameras, radar, sonar, and so on. The infrastructure sensors 280 may take many different forms and may include sensors such as those disclosed in relation to the vehicle 100 or at least similar thereto. In general, the infrastructure sensors 280 are stationary and are thus mounted to infrastructure components such as poles, buildings, traffic signs, and so on. In further aspects, the infrastructure sensors 280 can be integrated with street lights, traffic lights, embedded in a road surface, and so on. It should be appreciated that the foregoing is provided as a brief set of examples and are not intended to limit the implementations of the infrastructure sensors 280 envisioned herein.

Moreover, the infrastructure sensors 280 are generally situated in order to provide a comprehensive view of an associated roadway segment that is being observed. Thus, the infrastructure sensors 280 either individually or in combination capture the sensor data 250 over the roadway segment as a whole to provide observations of each portion thereof. For example, in one embodiment, the infrastructure sensors 280 include one or more sensors that scan a 360-degree field-of-view. In one embodiment, the sensors 280 include at least one LiDAR (e.g., similar to LiDAR 124). Alternatively, or additionally, the infrastructure sensors 280 include cameras (e.g., similar to cameras 126) to acquire video and/or still images of the roadway segment in visible and/or infrared light.

Furthermore, the roadway segment associated with the infrastructure system 200 is generally not limited to a particular configuration. That is, the roadway segment associated with the infrastructure system 200 may be a straight segment of road, an intersection of two or more roads, an intersection with a blind corner, a merge, a segment of highway, a local one or two-lane roadway, a school zone, a traffic circle, a toll, a bridge, and so on. Of course, the infrastructure system 200 may experience greater relevance in particular areas (e.g., congested city intersections) in comparison to other areas (e.g., highway straightaway); however, it should be appreciated that the arrangements of components and functions as disclosed herein are generally applicable to any configuration of roadway or another area through which vehicles traverse.

Accordingly, the acquisition module 220, in one embodiment, controls the respective sensors to provide the data inputs in the form of the sensor data 250. As an additional note, while the acquisition module 220 is generally discussed as controlling the various sensors to provide the sensor data 250, in one or more embodiments, the acquisition module 220 can employ other techniques to acquire the sensor data 250 that are either active or passive. For example, the acquisition module 220 may passively sniff the sensor data 250 from a stream of electronic information provided by the various sensors to further entities (e.g., police surveillance). The sensor data 250 is, in one embodiment, scan data that embodies observations of a surrounding environment that include the roadway segment. In general, as provided for herein, the acquisition module 220 receives the sensor data 250 from the respective sensors 280 and electronically stores the sensor data 250 in electronic data structures that organize the sensor data 250 for subsequent processing by the context module 230.

Furthermore, in one embodiment, the infrastructure system 200 includes the database 240. The database 240 is, in one embodiment, an electronic data structure stored in the memory 210 or another data store and that is configured with routines that can be executed by the processor 270 for analyzing stored data, providing stored data, organizing stored data, and so on. Thus, in one embodiment, the database 240 stores data used by the modules 220 and 230 in executing various functions. In one embodiment, the database 240 includes sensor data 250 along with, for example, other information that is used by the modules 220 and 230 such as the roadway context 260.

The sensor data 250 can include 3D point cloud data along with, for example, metadata describing additional characteristics about the acquired point cloud data such as a location, a time/day, and so on. The sensor data 250, in one embodiment, further includes camera images and/or video along with similar metadata as described in relation to the point cloud data. In further embodiments, the sensor data 250 includes information from further sensors such as weather sensors, radar sensors, sonar sensors, and so on.

The acquisition module 220, in one embodiment, is further configured to perform additional tasks beyond controlling the respective sensors to acquire and provide the sensor data 250. For example, the acquisition module 220 analyzes the sensor data 250 that is to be used by the context module 230 for generating the roadway context 260. In one embodiment, the acquisition module 220 generates semantic labels for a camera image and/or a point cloud. As used herein, semantic segmentation refers to a process by which images/point clouds are analyzed to understand the images/point clouds at the pixel level. In other words, the acquisition module 220 analyzes an image according to a semantic segmentation technique such that each pixel within the analyzed image/cloud is identified as belonging to a separate object that is represented therein. By way of example, the acquisition module 220 processes an image by identifying the separate objects within the image and annotating each pixel associated with the separate objects using a semantic label associated therewith. Thus, for an image that includes a roadway scene, the acquisition module 220 separately labels pixels associated with a road, a vehicle, a curb, a sidewalk, and so on. In this way, the acquisition module 220 distinguishes between separate aspects represented within the whole image and boundaries between each.

In one embodiment, the acquisition module 220 includes a neural network (e.g., convolutional neural network) that processes the image to generate the semantic labels. In further implementations, the acquisition module 220 implements different approaches for performing the semantic segmentation which can include deep convolutional encoder-decoder architectures or another suitable approach that generates the semantic labels for the separate object classes represented in the captured scene. Whichever particular approach the acquisition module 220 implements, the acquisition module 220 can perform the noted processing to assist the context module 230 in generating the roadway context.

In one embodiment, the context module 230 generally includes instructions that function to control the processor 270 to analyze the sensor data 250 in order to produce the roadway context 260 and to communicate the context to nearby vehicles. For example, in one embodiment, the context module 230 includes a learning module that is a machine learning algorithm configured to learn both dynamic and static aspects of the roadway segment. In one embodiment, the learning module is a convolutional neural network, a recursive neural network, or another deep learning model that can intake the sensor data 250 from various sensors and develop an understanding of the road segment therefrom in order to generate the roadway context.

For example, the learning module 230 develops a learned understanding of the roadway segment by training on the sensor data 250 across different times of day, days of the week, and so on. Accordingly, the learning module learns about variations in the roadway segment in relation to temporally relevant aspects such as traffic, weather, and so on. In one approach, the acquisition module 220 at least semi-continuously trains the learning module through the use of reinforcement learning or another feedback mechanism. For example, the acquisition module 220 trains the learning module by providing sensor data that is pre-annotated/labeled into the learning module and comparing provided results with the labels in order to adjust internal parameters of the learning module to improve future results.

Through this training process, the learning module develops a learned understanding of the road segment as embodied by the internal parameters of the learning module from the training on the roadway segment. In general, the learning module develops the learned understanding about both static and dynamic aspects of the roadway segment. For example, the learning module develops a static context or general understanding of static infrastructure and variations to the static infrastructure that routinely occurs over time. By way of example, the static infrastructure can include curbs, lane markings, poles, trees, buildings, and other aspects that may be positioned in relation to the roadway segment that do not generally change from day-to-day or at least change in a known regular manner (e.g., routine closing of lanes for a school zone). The variations in the static infrastructure that may be embodied within the static context can include weather-related aspects (e.g., flooding, snow mounds, etc.), construction infrastructure (e.g., barrels, cones, signs), and so on. In one embodiment, the context module 230 executes the learning module over acquired sensor data 250 in order to identify static elements of the roadway segment that form a background. Thus, the context module 230, in one embodiment, communicates the background to nearby vehicles in order to facilitate background subtraction and identification of dynamic objects. Accordingly, the nearby vehicles can use the provided background without the need to spend computational resources on determining the background individually and according to the developed understanding of the static context embodied in the infrastructure system 200.

In still further aspects, the context module 230 executes the learning module over the sensor data 250 to identify dynamic objects and aspects relating to irregular/regular occurrences of the dynamic objects. For example, the dynamic objects include vehicles, pedestrians, animals, moving or transient objects, and so on. Thus, the context module 230 leverages the learned understanding of the learning module for a particular day/time and present conditions (e.g., weather, day/night) to determine, for example, whether the identified dynamic objects and associated trajectories thereof represent potential hazards, threats to other vehicles, and so on. As such, in one embodiment, when a vehicle approaches the roadway segment, the context module 230 determines the present dynamic context with consideration to the current position of the vehicle, a known trajectory of the vehicle, and, if available, a known route of the vehicle.

Thus, providing the roadway context 260 can include suggesting actions to the vehicle 100 such as a preferred path through the roadway segment that considers latent risks (e.g., hidden objects, blind corners, etc.), trajectories of other dynamic objects, traffic, traffic signal timing, and so on. In further aspects, the context module 230 provides a multi-level contextual assessment that is customized according to the vehicle. In one aspect, the roadway context 260 indicates risk avoidance maneuvers in varying levels of detail by indicating, for example, a suggested speed, a particular turn or turn rate, the presence of a direct risk, an immediate avoidance maneuver, and so on. Thus, the context module 230, in one embodiment, communicates with the vehicle 100 to identify the capabilities of the vehicle 100 and to tailor the roadway context 260 according thereto. Thus, if the vehicle 100 is capable of a higher order understanding such as abstracted threats and suggested actions, then the context module 230 generates the roadway context 260 to more broadly indicate threats and suggest avoidance strategies. By contrast, if the vehicle 100 is not configured in such a manner or with sufficient computing resources to accept a higher order instruction, then the context module 230 provides the roadway context 260 to indicate relevant dynamic objects with, for example, trajectories that are related to (e.g., may cross) a trajectory of the vehicle 100. In this way, the infrastructure system 200 informs oncoming vehicles about contextual aspects of the roadway segment in a manner that is particular to abilities of the oncoming vehicles to improve a situational awareness of the vehicles.

Figure 3:
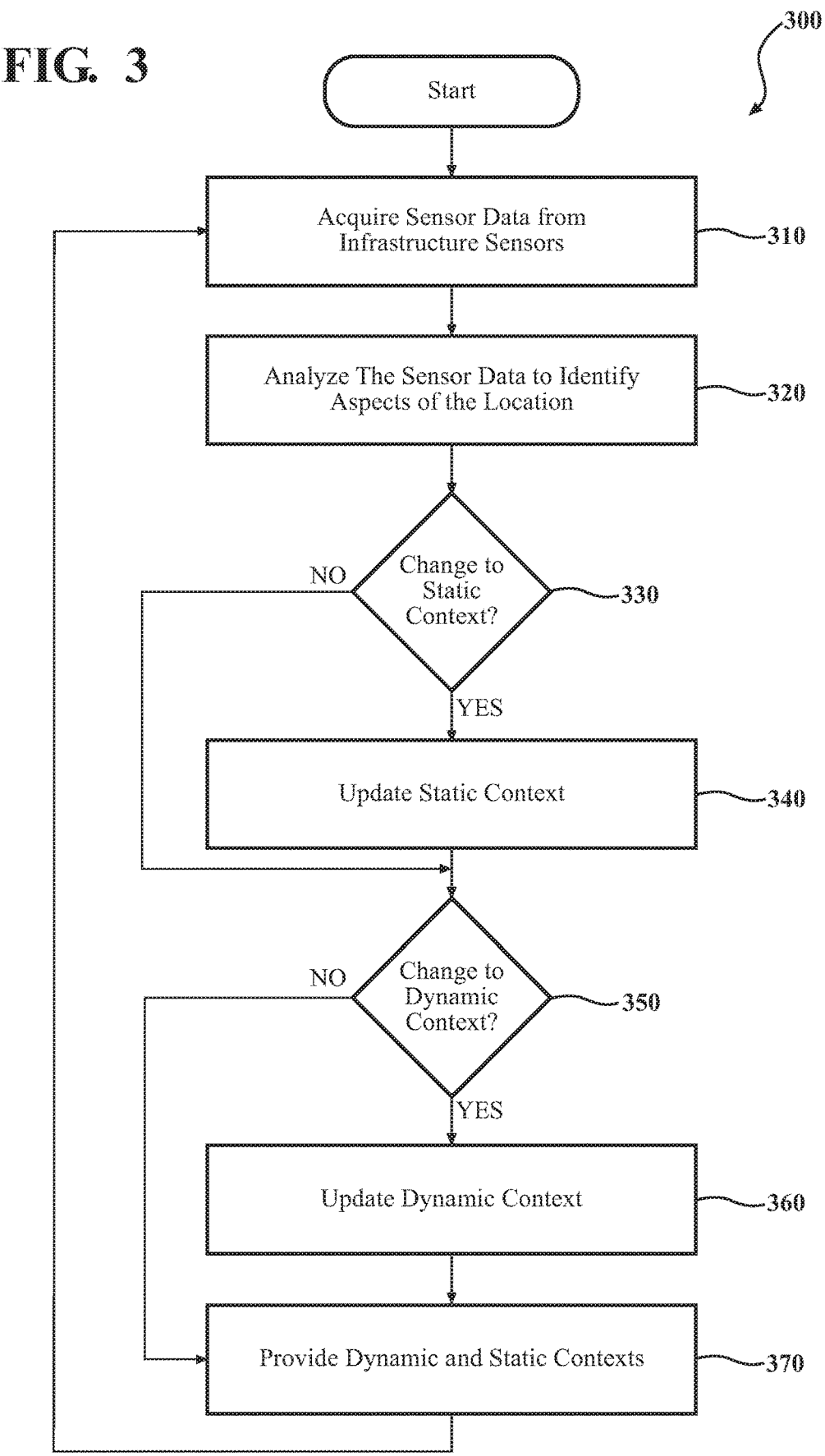
FIG. 3 illustrates one embodiment of a method associated with learning about aspects of a roadway segment to develop a roadway context.

Additional aspects of generating the roadway context will be discussed in relation to FIG. 3. FIG. 3 illustrates a flowchart of a method 300 that is associated with generating a roadway context. Method 300 will be discussed from the perspective of the infrastructure system 200 of FIG. 2. While method 300 is discussed in combination with the infrastructure system 200, it should be appreciated that the method 300 is not limited to being implemented within the infrastructure system 200 but is instead one example of a system that may implement the method 300.

At 310, the acquisition module 220 acquires sensor data from at least one infrastructure sensor 280 associated with the roadway segment at which the infrastructure system is situated. In one embodiment, the acquisition module 220 periodically acquires the sensor data 250. The frequency at which the acquisition module 220 acquires the sensor data 250, in one approach, varies according to various parameters. In one embodiment, the acquisition module 220 initially acquires the sensor data 250 with an increased frequency in order to provide for training the learning module and developing the learned understanding of the roadway segment. However, once trained, the acquisition module 220 may acquire the sensor data 250 less frequently in order to economize computing resources.

Moreover, the acquisition module 220, in one approach, dynamically adjusts the acquisition frequency according to current circumstances associated with the roadway segment. For example, the acquisition module 220 acquires the sensor data 250 more frequently when the infrastructure sensors 280 indicate movement, during peak traffic, during school zone hours, and so on. Additionally, the acquisition module 220, in one aspect, increases the frequency with which the sensor data 250 is acquired upon previously detecting a change to the roadway segment in relation to, for example, static infrastructure elements. Furthermore, the acquisition module 220, in one approach, acquires the sensor data 250, in response to a nearby vehicle (e.g., the vehicle 100) approaching the roadway segment. In such a case, the nearby vehicle may transmit a context request to the infrastructure system 200 that induces the acquisition module 220 to newly acquire the sensor data 250 and perform further functions as subsequently discussed. In any case, the acquisition module 220 generally functions to control, communicate with, or otherwise acquire the sensor data 250 from the infrastructure sensors 280.

It should be noted that the infrastructure sensors 280 may be integrated as part of the infrastructure system 200 or provided separately as standalone individual sensors. Thus, the infrastructure sensors 200 may communicate with the infrastructure system 200 via a wired or wireless connection to convey the sensor data 250. Moreover, the infrastructure system 200, in one embodiment, is implemented as an infrastructure device that may be integrated with existing traffic control systems, lights, or other infrastructure. Accordingly, the infrastructure system 200 may use existing communication links (e.g., existing wired connections) to acquire the sensor data 250, direct wired connections, and/or wireless connections established according to any suitable protocol. In this way, the acquisition module 220 acquires the sensor data 250 including observations from the infrastructure sensors 280 that are statically mounted to observe the roadway segment.

Moreover, as part of controlling the sensors 280 to acquire the sensor data 250, it is generally understood that the sensors acquire the sensor data 250 of the roadway segment including an overlap of a field of view between the sensors (e.g., camera image and the point cloud data). In one embodiment, the sensor data 250 may include only a partial overlap between sensors 280. In general, the sensor data 250 need not be of the exact same bounded region in the surrounding environment but should include a sufficient area of overlap such that the sensor data 250 includes comprehensive coverage of the roadway segment.

At 320, the context module 230 analyzes the sensor data 250 to produce a roadway context 260. The roadway context is, for example, a characterization of a current state of the roadway segment. In one embodiment, the roadway context includes both static and dynamic contexts that characterize separate aspects of the roadway segment. For example, the static context characterizes a background of the roadway segment that includes static infrastructure elements of the roadway segment including at least lane markings, curbs, and poles.

Thus, the context module 230, at 320, executes the learning module to process the sensor data 250 of a most recent acquisition according to a learned understanding about the roadway segment embodied within the learning module. As previously noted, the learning module is a machine learning algorithm that generates the learned understanding over successive observations of the roadway segment and in relation to different times and configurations of the roadway segment. Accordingly, by executing the learning module over the presently acquired sensor data 250, the context module 230 generates the static context as a present assessment of the static aspects of the road segment and whether any abnormalities exist in relation to the static infrastructure. For example, as part of the static context, the learning module produces an understanding of the background of the road segment. In other words, the learning module is indicating which objects, surfaces, markings, etc. are static and are generally unchanging and expected to remain unchanged for a traversal of a vehicle through the road segment. The context module 230 executes the learning module to determine the static context in order to account for variations in the static infrastructure that may be from one or more of weather, temporary obstructions, traffic, and so on. In this way, the context module 230 identifies irregularities that can affect a vehicle as the vehicle proceeds through the roadway segment and also determines changes to the static infrastructure over time.

At 330, the context module 230 determines if the static context includes changes in comparison to a previously known state of the static context. In one embodiment, as part of executing the learning module over the sensor data 250, the learning module indicates whether changes are present to the static infrastructure. In general, the learning module is aware of which aspects of the roadway segment are temporary, are dynamic, or are static infrastructure elements. Thus, the learning module is generally aware of common fluctuations in the static infrastructure from weather conditions (e.g., snow piles, flooding, etc.), periodic maintenance (e.g., construction barrels for manhole access), doors/windows opening/closing, traffic cones for school zones, and so on. Thus, the learning module is capable of identifying the noted aspects, determining whether the noted aspects are expected variations to the static infrastructure or whether the variations represent irregularities that should be further monitored. Thus, at 330, the learning module identifies irregular variations that may constitute changes to the static context of the roadway segment according to the learned understanding of the learning module.

At 340, the context module 230 updates the static context according to the identified changes. It should be noted, that while blocks 320, 330, and 340 are generally discussed successively and as a single iteration, in general, the learning module observes the roadway segments over many iterations of performing the functions noted at the respective blocks to develop the learned understanding about the static infrastructure of the roadway segment. Thus, when the learning module initially identifies an irregularity in the static context, the learning module may not initially update the static context itself but instead further analyzes the perceived change over subsequent observations to determine if the change is legitimate or simply an aberration.

In either case, the context module 230, in one approach, indicates the perceived change as an irregularity in the static context and is conveyed to nearby vehicles as such until a final determination about the irregularity is determined by the learning module. Thus, the learning module, in one aspect, waits for a defined period of time (e.g., one week or more) with the irregularity being unchanged before updating the static context to indicate a change. In further aspects, the learning module trains on the irregularity through feedback from the passing vehicles or other sources (e.g., manual investigation) to determine origins of the irregularity. For example, consider that a new building is constructed on a previously empty lot, in such a circumstance, the learning module initially identifies the change to the static context as an irregularity. However, the construction of the building is a continuous process over potentially many months and thus does not normalize until completion. Thus, the learning module, in one aspect, indicates the continuously changing nature of the building and continues to observe the construction.

In one embodiment, the learning module may classify the construction as new infrastructure that is under development and thus may reflect this status in the static context. In either case, the learning module undertakes a nearly continuous training in order to generate the learned understanding of the roadway segment such that the learning module can characterize static aspects of the roadway segment and occurrences of events within the roadway segment relating to the static aspects according to correlations between the occurrences, times associated with the occurrences, and dynamic objects present during the occurrences (e.g., construction equipment). In this way, the learning module facilitates a nearly continuous evolution of how the roadway segment is understood in order to provide accurate assessments of the static infrastructure to nearby vehicles in the form of the static context.

At 350, the context module 230 determines whether there is a change to the dynamic context. As mentioned in relation to the static context, the context module 230, at 320, executes the learning module to process the sensor data 250 of a most recent acquisition according to a learned understanding about the roadway segment embodied within the learning module. Accordingly, by executing the learning module over the presently acquired sensor data 250, the context module 230 generates the dynamic context as a present assessment of dynamic aspects of the road segment and whether any abnormalities exist in relation to the learned understanding embodied with the learning module about dynamic objects that occur within the roadway segment.

Accordingly, the dynamic context characterizes dynamic objects and dynamic infrastructure elements associated with the roadway segment including at least pedestrians, other vehicles, animals, inanimate movable objects, construction infrastructure (e.g., construction barrels), and so on. Moreover, the context module 230 can generate the dynamic context in relation to a particular nearby vehicle in order to characterize the dynamic aspects in relation to how the dynamic aspects may affect the nearby vehicle. As such, at 350, the learning module is identifying which aspects vary from what is expected according to the learned understanding. Thus, when previously unobserved dynamic objects (e.g., a military vehicles) are perceived, when new traffic patterns or congestion is perceived, when previously unobserved events (e.g., car chase) are perceived, and, more generally, when previously unobserved dynamic aspects occur, the context module 230 further trains the learning module on the new dynamic aspects by indicating the presence of a change/irregularity at 350 in relation to the previously defined learned understanding.

It should be noted, that the dynamic aspects of a roadway segment can vary widely and may include many different combinations of dynamic objects, timing, and so on. Thus, in various implementations, the learning module organizes the various changes into different classifications according to effects on the nearby vehicle. For example, the learning module, in one approach, classifies the dynamic objects and associated events according to a safety impact on the nearby vehicle (e.g., safe, marginal, dangerous, etc.), influence on congestion through the roadway segment, a combination of the noted aspects, and/or according to broadly abstracted contextual classifications such as safety event, congestion event, weather hazard, direct threat (e.g., vehicle on a collision path), and so on. In either case, for dynamic aspects that have not been previously observed, the context module 230 indicates the occurrence of potential changes at 350.

At 360, the context module 230 updates the dynamic context. As noted, the context module 230 executes the learning module to generate the roadway context for particular vehicles but also to maintain and further develop the learned understanding about the roadway segment embodied in the learned module. Accordingly, the context module 230 updates the dynamic context by training the learning module according to the newly observed dynamic aspects. In various embodiments, the context module 230 implements different forms of training such as reinforcement learning. In either case, the context module 230 uses the observations to further learn aspects of the roadway segment. As further noted, the context module 230, in one approach, uses information communicate from the vehicles to confirm, label, or otherwise supplement observations of the infrastructure system 200. In still further aspects, the infrastructure system 200 implements an annotation process either automated (e.g., semantic segmentation) or manual to provide information about the new observations. In this way, the context module 230 facilitates independently developing the learned understanding of the roadway segment.

At 370, the context module 230 provides the roadway context 260 (i.e., static and dynamic contexts) as an electronic output. In one embodiment, the context module 230 stores the roadway context 260 in an electronic storage medium for subsequent use, electronically communicates the roadway context 260 to one or more nearby vehicles, uses the roadway context 260 as a comparison against known elements to further train the learning module, and so on. In general, it should be appreciated that the roadway context 260 is a result of executing the learning module over the sensor data 250 from a current acquisition of data from the sensors 280. Thus, the roadway context 260 represents learned aspects of the roadway segment as understood by the learning module and embodied within, for example, a latent space, internal nodal weighting, or other internal computational structures of the learning module. In this way, the infrastructure system 200 leverages the learning module to develop an understanding of both static and dynamic aspects of the roadway segment and provide contextual awareness about the roadway segment therefrom.

Figure 4:
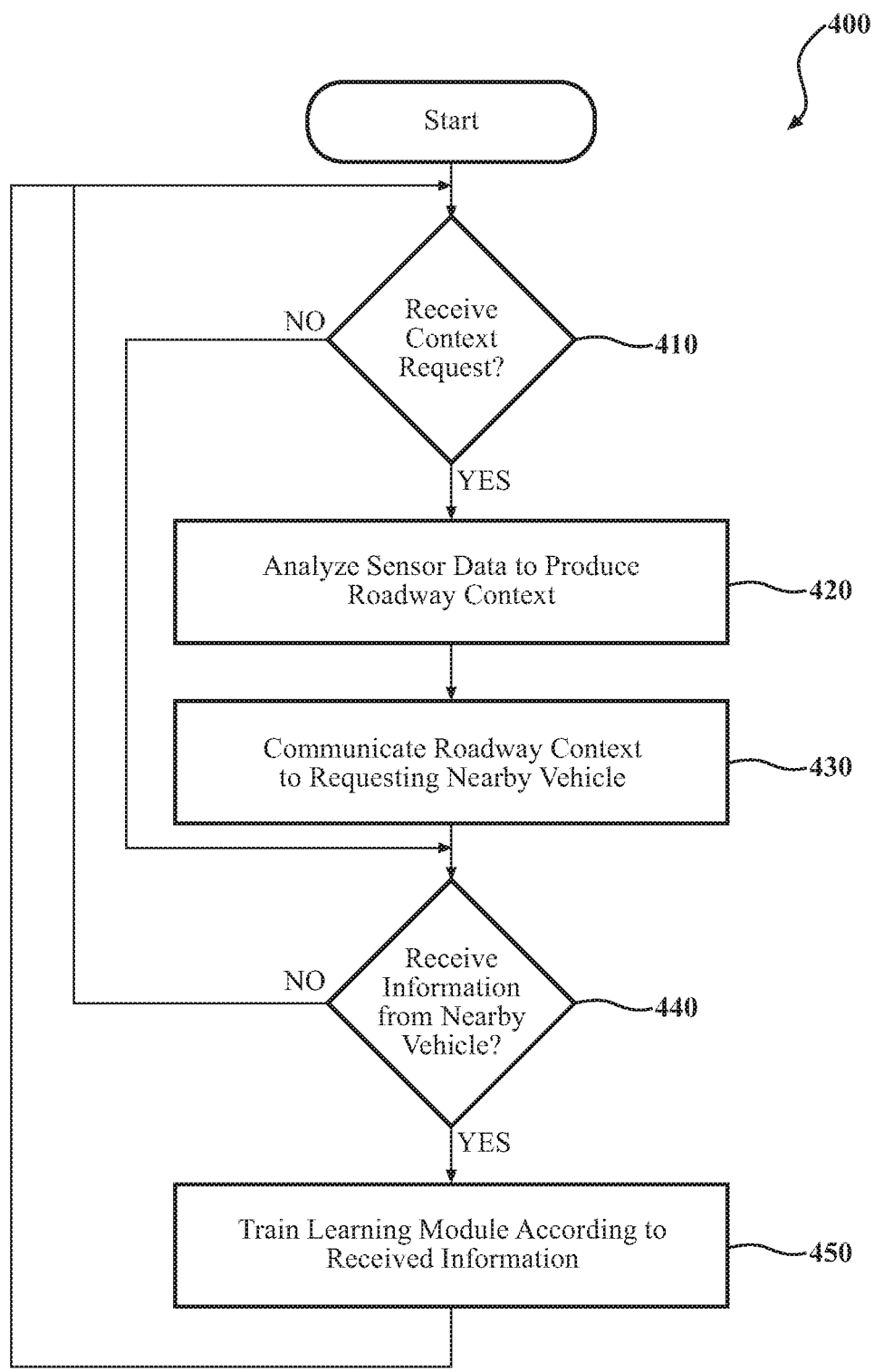
FIG. 4 illustrates one embodiment of a method associated with communicating a roadway context to a nearby vehicle.

FIG. 4 illustrates a flowchart of a method 400 that is associated with providing contextual awareness about a roadway segment from an infrastructure device to nearby vehicles. Method 400 will be discussed from the perspective of the infrastructure system 200 of FIG. 2 and the vehicle 100 of FIG. 1. While method 400 is discussed in combination with the infrastructure system 200 and the vehicle 100, it should be appreciated that the method 400 is not limited to being implemented within the infrastructure system 200 or with the vehicle 100 but is instead one example of a system that may implement the method 400.

At 410, the acquisition module 220 monitors for a context request from a nearby vehicle. In one embodiment, the acquisition module 220 broadcasts a beacon identifying the presence of the infrastructure system 200 to approaching vehicles. In general, the infrastructure system 200 communicates wirelessly with the infrastructure module 170 embedded within approaching/nearby vehicles according to a vehicle-to-infrastructure (V2I) protocol, or another means of wireless communication (e.g., cellular). It should be appreciated that the infrastructure system 200 can include a plurality of antennas for receiving and transmitting communications and that are strategically located in areas approaching the roadway segment in order to provide for initiating communications prior to the vehicles reaching the roadway segment. In further aspects, the infrastructure system 200 passively listens for communication requests instead of broadcasting and waiting for a response. In either case, the acquisition module 220 detects context requests communicated to the infrastructure system 200. In alternative arrangements, the infrastructure system 200 is configured to periodically broadcast the roadway context 260 without receiving an explicit request. In either case, the infrastructure system 200 generally communicates the roadway context 260 wirelessly to approaching vehicles.

At 420, the context module 230 analyzes the sensor data 250 to generate the roadway context 260. As previously indicated, the acquisition module 220 is at least semi-continuously acquiring the sensor data 250 so that the context module 230 can analyze a current state of the roadway segment, learn changing aspects of the roadway segment, and produce the roadway context as a characterization of the current state of the roadway segment as a result. As such, when the acquisition module 220 receives the request from the nearby vehicle 100, in one embodiment, the acquisition module 220 acquires the sensor data 250 and the context module 230 generates the roadway context 260. In one approach, the context module 230 generates the roadway context 260 as a multi-level contextual assessment of the roadway segment for a current time associated with the sensor data 250. That is, the context module 230, in one embodiment, customizes one or more aspects of the roadway context 260 for the nearby vehicle 100.

For example, while the static context may be similar for each vehicle since the static infrastructure generally relates similarly to each vehicle, the dynamic context is more particular with respect to individual vehicles since dynamic objects present within the roadway segment affect vehicles differently depending on present location, trajectory, size, and so on. Moreover, because computational abilities (e.g., available computing resources, system configurations) differ between vehicles, some vehicles may be able to process more abstracted contextual indications. Therefore, in one embodiment, the context module 230, in generating the dynamic context considers a current position, trajectory, computational abilities, and other aspects relating to the nearby vehicle 100 that has requested the roadway context 260.

Accordingly, the context module 230 produces the roadway context 260 to include a dynamic context that indicates a selected level of granularity about the dynamic objects according to at least abilities of the nearby vehicle in addition to which dynamic objects will likely affect the nearby vehicle 100 and how the nearby vehicle 100 will likely be affected. Of course, as indicated the precise form of the indications generally depends on capabilities of the vehicle 100. Thus, in one aspect, as part of receiving the context request at 410, the acquisition module 220 further receives parameters indicating abilities/a preferred form of the roadway context 260. Of course, when such an indication is not available such as when the roadway context 260 is broadcast, the context module 230 generates the roadway context 260 in a default format.

In either case, the context module 230 produces the static context to at least facilitate background subtraction by the vehicle 100 when, for example, identifying objects present in the roadway segment. Moreover, the context module 230 generates the dynamic context to indicate at least positions of the dynamic objects in relation to the nearby vehicle 100, trajectories of the dynamic objects, and contextual aspects such as hazards, and so on that are particularly relevant to the vehicle 100 as related to the position, trajectory, etc. of the vehicle 100.

At 430, the context module 230 communicates the roadway context 260 to the nearby vehicle 100 to improve a situational awareness of the nearby vehicle 100 with respect to the roadway segment. As previously noted, the context module 230 can communicate with the vehicle 100 using one or more communications protocols; however, it should be appreciated, that the communications are wireless and occur such that the vehicle 100 is provided with the roadway context 260 prior to proceeding through the roadway segment. Moreover, in various embodiments, the context module 230 provides the roadway context 260 or at least part of the roadway context 260 as updates to the vehicle 100 as the vehicle proceeds through the roadway segment. In this way, the infrastructure system 200 ensures that the vehicle 100 is provided with a real-time assessment of aspects relating to the roadway segment.

At 440, the acquisition module 220 determines whether a nearby vehicle (e.g., vehicle 100) is communicating information back to the infrastructure system 200. In one embodiment, the infrastructure system 200 communicates with the nearby vehicle 100 to acquire information from one or more sensors of the nearby vehicle 100, to acquire an assessment of the roadway context 260, and so on.

At 450, the acquisition module 220 trains the learning module according to the received information. In one embodiment, the assessment correlates information in the roadway context 260 with observations of the nearby vehicle 100 to provide feedback about the roadway context 260. Similarly, the infrastructure system 200 uses the information from the sensors of the vehicle 100 to compare against the roadway context 260 from which further training/refinements to the learning module are performed. In this way, the infrastructure system 200 learns aspects of the roadway segment to improve an awareness of the roadway segment.

Figure 5:
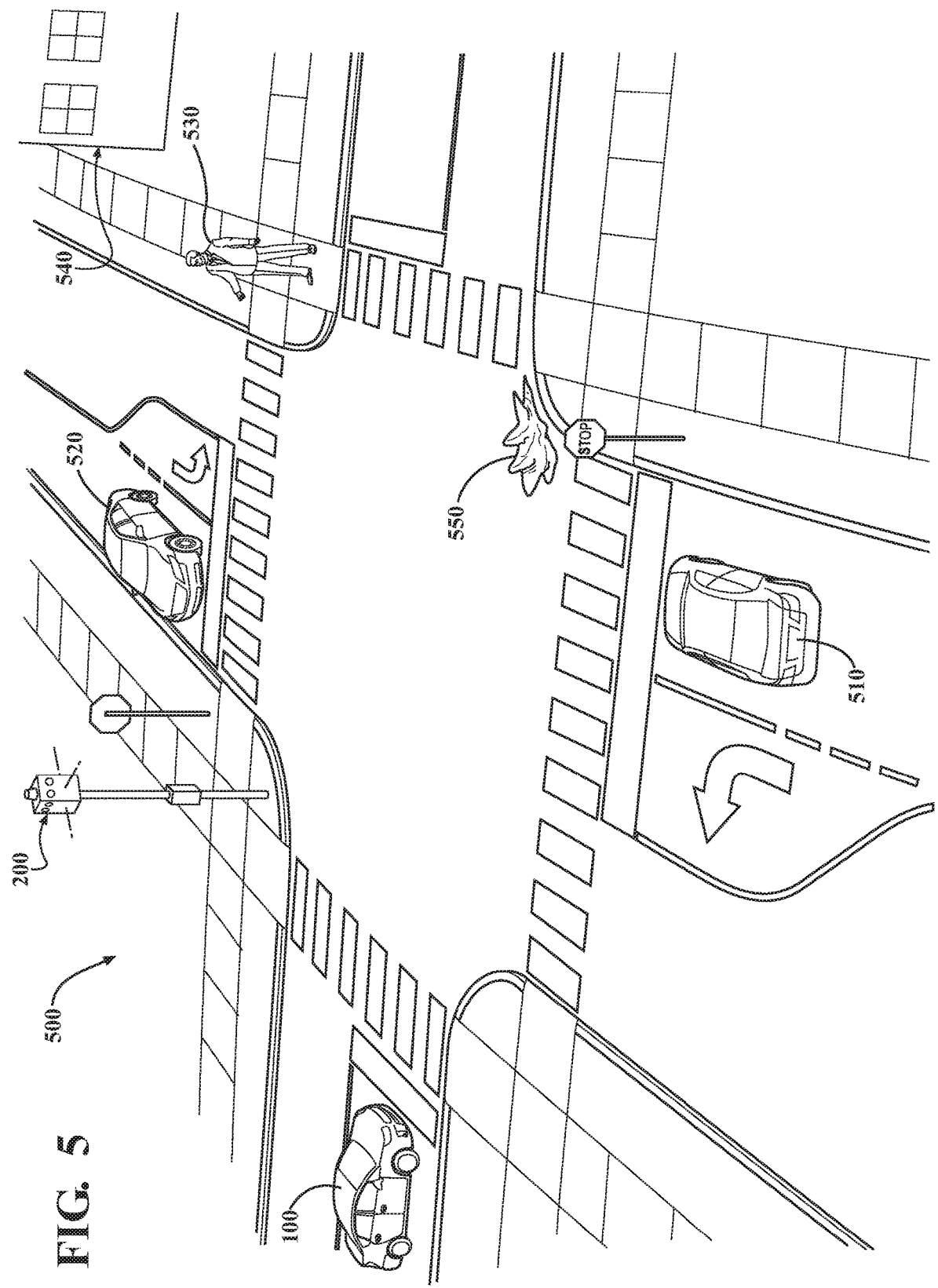
FIG. 5 illustrates one example of a roadway segment that includes an intersection of two roads.

As a further explanation of how the infrastructure system 200 improves the awareness of vehicles traversing the roadway segment consider FIG. 5. FIG. 5 illustrates an example roadway segment 500 that is an intersection of two roads. FIG. 5 includes an implementation of the infrastructure system 200 that is statically mounted to a pole at a corner of the intersection 500. Moreover, the vehicle 100 is illustrated as approaching the intersection 500 and should be considered to be in communication with the infrastructure system 200. Thus, the infrastructure system 200, in response to the context request from the vehicle 100, acquires the sensor data 250 that includes observations of a vehicle 510, a vehicle 520, a pedestrian 530, a building 540, a hazard 550, and further aspects such as lane markings, curbs, crosswalks, and so on.

Accordingly, from the sensor data 250, the infrastructure system 200 generates the roadway context 260 in relation to the vehicle 100. That is, the infrastructure system 200 executes the learning module over the sensor data 250 and with awareness of the location and trajectory of the vehicle 100. Thus, the infrastructure system 200 communicates the static context back to the vehicle 100, which generally includes aspects such as the building 540, the lane markers, curbs, the infrastructure system 200 mounted on the pole, and so on. The static infrastructure generally indicates a background of unchanging aspects (at least within the immediate future) of the roadway segment 500, and thus the vehicle 100 uses the background to facilitate independently identifying the dynamic objects (e.g., vehicles 510 and 520 along with the pedestrian 530). Moreover, the static context can further indicate aspects of the roadway segment 500 that are hazards in a path of the vehicle 100 such as pothole 550. Thus, the infrastructure system 200 can indicate potential hazards for aspects such as the pothole 550 as a general indication, as a specific indication upon attaining knowledge of the route/path of the vehicle 100, and so on.

Moreover, the infrastructure system 200 further communicates the dynamic context to the vehicle 100 that specifies the location and trajectories of the dynamic objects 510, 520, and 530. Additionally, depending on the particular trajectories of the dynamic objects and the vehicle 100, the dynamic context can further indicate whether the dynamic objects are potential hazards to the vehicle 100. If the infrastructure system 200 determines that one or more of the dynamic objects are potential hazards, then the infrastructure system 200 can indicate maneuvers to avoid hazards. In one approach, the infrastructure system 200 provides commands directly to an autonomous driving module 160 of the vehicle through the infrastructure module 170 in order to cause the vehicle 100 to evade potential collisions or other hazards (e.g., erratic pedestrians). Moreover, where congestion through the roadway segment 500 may be influenced by hazards such as the pothole 550, the infrastructure system 200 may suggest modifications to a route of the vehicle 100 to avoid the hazards. In this way, the infrastructure system 200 supplements the situational awareness of the vehicle 100 with the roadway context 260 to improve an overall awareness of the roadway segment 500 and thereby improve operation for the vehicle 100 through the roadway segment 500 by offloading at least some computing tasks while also providing increased knowledge through the additional information.

Figure 6:
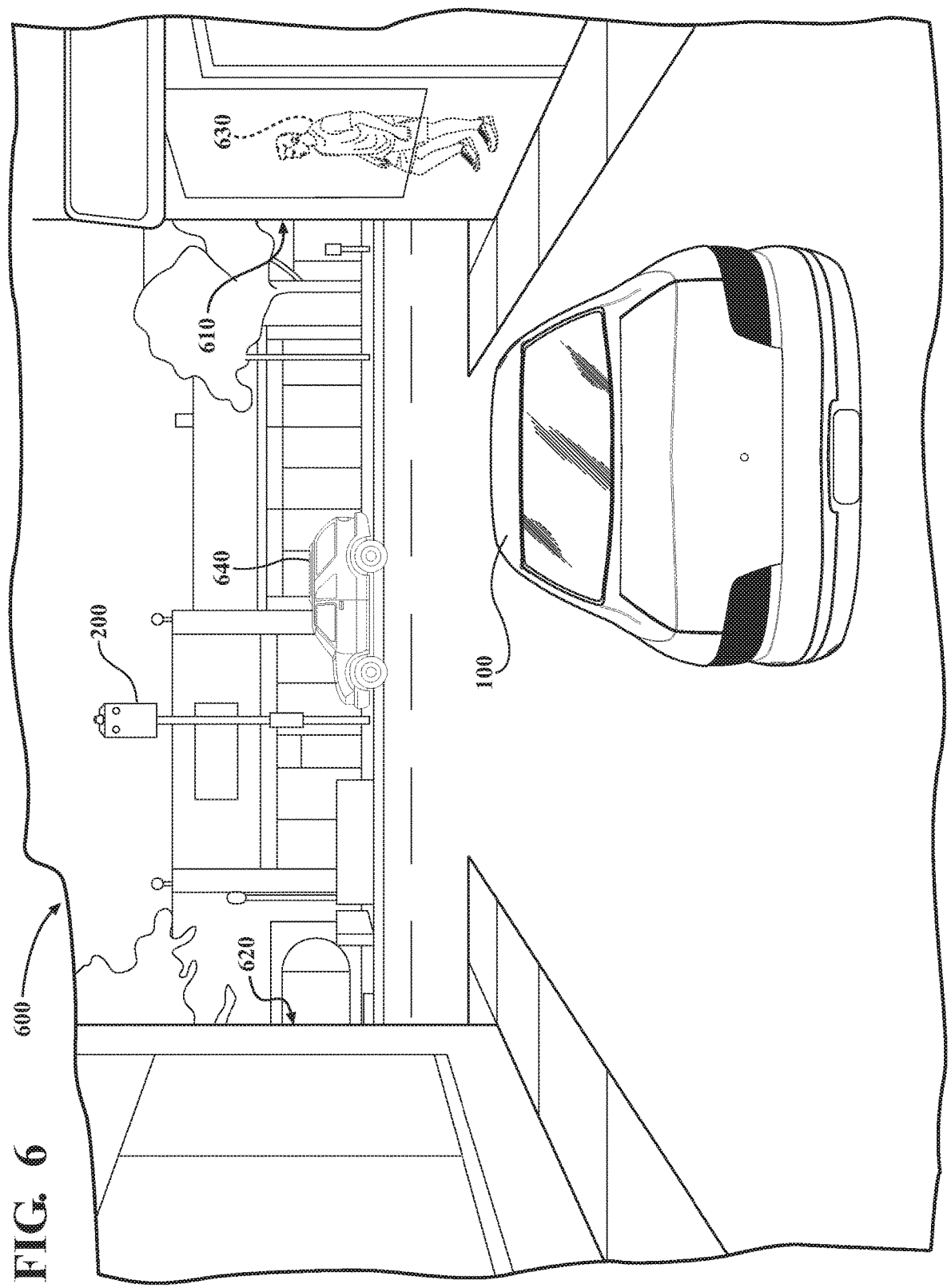
FIG. 6 illustrates an example of a roadway segment that includes a blind corner.

As another example of how the infrastructure system 200 improves the awareness of vehicles traversing a roadway segment consider FIG. 6. FIG. 6 illustrates an example roadway segment 600 that is a 3-way intersection with two blind corners 610 and 620. FIG. 6 includes an implementation of the infrastructure system 200 that is statically mounted opposite to the blind corners 610 and 620 in order to provide a comprehensive view of the roadway segment 600. Thus, as the vehicle 100 approaches the roadway segment 600, the infrastructure system 200 provides the roadway context 260, which, in the instant case, identifies potential hazards associated with dynamic objects behind the blind corner 610 such as the pedestrian 630. Consequently, even though the vehicle 100 cannot directly observe the pedestrian 630, the vehicle 100 is aware of the pedestrian due to information obtained from the roadway context 260.

Moreover, the vehicle 100 is illustrated as approaching the intersection 600 and should be considered to be in communication with the infrastructure system 200. Thus, the infrastructure system 200, provides the roadway context to the vehicle 100 that indicates the static context including the illustrated buildings, sidewalks, lanes, and so on. The static context, in the illustrated case, also indicates potential hazards associated with latent aspects of the roadway segment. For example, the static context indicates that the blind corners 610 and 620 represent potential hazards for which the vehicle 100 should exhibit extra care. Moreover, the dynamic context for the current state of the roadway segment 600 in relation to the vehicle 100 indicates positions and trajectories of dynamic objects 630 and 640 of which the vehicle 100 cannot yet observe the pedestrian 630. Accordingly, the dynamic context can further indicate the hazard associated with the pedestrian 630 and may also suggest avoidance maneuvers such as a slower rate of travel, activating a horn of the vehicle 100, and so on. In this way, the infrastructure system 200 improves control of the vehicle 100 through the roadway segment 600.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the infrastructure module 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the infrastructure module 170, and/or the autonomous driving module(s) 160 may control some or all of these vehicle systems 140 and, thus, may be partially or fully autonomous.

The processor(s) 110, the infrastructure module 170, and/or the autonomous driving module(s) 160 can be operatively connected to communicate with the various vehicle systems 140 and/or individual components thereof. For example, returning to FIG. 1, the processor(s) 110, the infrastructure module 170, and/or the autonomous driving module(s) 160 can be in communication to send and/or receive information from the various vehicle systems 140 to control the movement, speed, maneuvering, heading, direction, etc. of the vehicle 100. The processor(s) 110, the infrastructure module 170, and/or the autonomous driving module(s) 160 may control some or all of these vehicle systems 140.

The processor(s) 110, the infrastructure module 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the infrastructure module 170, and/or the autonomous driving module(s) 160 can control the direction and/or speed of the vehicle 100. The processor(s) 110, the infrastructure module 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules described can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the infrastructure module 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by the context module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An infrastructure system for providing contextual awareness about a roadway segment from an infrastructure device, comprising:
  one or more processors;
  a memory communicably coupled to the one or more processors and storing:
  an acquisition module including instructions that when executed by the one or more processors cause the one or more processors to, in response to receiving a context request from a nearby vehicle, acquire sensor data from at least one infrastructure sensor associated with the roadway segment; and
  a context module including instructions that when executed by the one or more processors cause the one or more processors to analyze the sensor data to produce a roadway context by executing a learning module over the sensor data, wherein the roadway context is a characterization of a current state of the roadway segment,
  wherein the context module includes instructions to execute the learning module to process the sensor data according to a learned understanding about the roadway segment, wherein the learning module is a machine learning algorithm that generates the learned understanding over successive observations of the roadway segment and in relation to different times and configurations of the roadway segment,
  wherein the context module includes instructions to communicate the roadway context to the nearby vehicle to improve a situational awareness of the nearby vehicle about the roadway segment,
  wherein the context module includes instructions to analyze the sensor data including instructions to generate a static context as part of the roadway context to characterize a background of the roadway segment that includes static infrastructure elements of the roadway segment, and
  wherein the learning module accounts for variations in the static infrastructure when generating the static context, the variations being from one or more of weather, temporary obstructions, and traffic to identify irregularities that affect the nearby vehicle.

2. The infrastructure system of claim 1, wherein the static infrastructure elements of the roadway segment comprising at least lane markings, curbs, and poles.

3. The infrastructure system of claim 2, wherein the context module includes instructions to communicate the roadway context includes communicating the static context to the nearby vehicle to facilitate background subtraction and identification of dynamic objects by the nearby vehicle when the nearby vehicle is within an area of the roadway segment.

4. The infrastructure system of claim 1, wherein the context module includes instructions to analyze the sensor data includes generating a dynamic context as part of the roadway context to characterize dynamic objects and dynamic infrastructure elements associated with the roadway segment including at least pedestrians, other vehicles, and construction infrastructure, and
wherein the context module includes instructions to execute the learning module to process the sensor data according to a learned understanding about the dynamic objects and the dynamic infrastructure that occur in relation to the roadway segment including behaviors of the dynamic objects observed over successive observations of the roadway segment in relation to different times.

5. The infrastructure system of claim 4, wherein the context module includes instructions to analyze the sensor data including instructions to generate the dynamic context for the nearby vehicle to indicate a selected level of granularity about the dynamic objects according to at least abilities of the nearby vehicle,
wherein the dynamic context indicates at least positions of the dynamic objects in relation to the nearby vehicle and trajectories of the dynamic objects,
wherein the context module includes instructions to communicate the roadway context including instructions to communicate the dynamic context to the nearby vehicle to facilitate the contextual awareness of the nearby vehicle about the dynamic objects, and wherein the context module includes instructions to analyze the sensor data using the learning module to account for irregularities associated with the dynamic objects and dynamic infrastructure at the roadway segment that affect the nearby vehicle.

6. The infrastructure system of claim 1, wherein the acquisition module includes instructions to train the learning module to generate a learned understanding as part of the learning module that characterizes the roadway segment through observations of the roadway segment and occurrences of events within the roadway segment according to correlations between the occurrences, times associated with the occurrences, and dynamic objects present during the occurrences,
wherein the context module includes instructions to analyze the sensor data including instructions to generate the roadway context as a multi-level contextual assessment of the roadway segment for a current time associated with the sensor data, and wherein the roadway segment is an intersection of two separate roads.

7. The infrastructure system of claim 1, wherein the context module includes instructions to communicate with the nearby vehicle including instructions to receive information from the nearby vehicle including one or more of information from a sensor of the nearby vehicle, and an assessment of the roadway context, wherein the assessment correlates information in the roadway context with observations from the nearby vehicle to provide feedback about the roadway context.

8. The infrastructure system of claim 1, wherein the context module includes instructions to communicate including instructions to generate communications transmitted to the nearby vehicle according to a vehicle-to-infrastructure (V2I) protocol, and
wherein the acquisition module includes instructions to acquire the sensor data includes acquiring observations from one or more sensors that are statically mounted at the roadway segment to observe the roadway segment and communicate the sensor data to the infrastructure device.

9. A non-transitory computer-readable medium for providing contextual awareness about a roadway segment from an infrastructure device and including instructions that when executed by one or more processors cause the one or more processors to:
in response to receiving a context request from a nearby vehicle, acquire sensor data from at least one infrastructure sensor associated with the roadway segment;
analyze the sensor data to produce a roadway context by executing a learning module over the sensor data, wherein the roadway context is a characterization of a current state of the roadway segment,
wherein the instructions to execute the learning module include instructions to process the sensor data according to a learned understanding about the roadway segment, wherein the learning module is a machine learning algorithm that generates the learned understanding over successive observations of the roadway segment and in relation to different times and configurations of the roadway segment; and
communicate the roadway context to the nearby vehicle to improve a situational awareness of the nearby vehicle about the roadway segment, wherein the instructions to analyze the sensor data include instructions to generate a static context as part of the roadway context to characterize a background of the roadway segment that includes static infrastructure elements of the roadway segment,
wherein the learning module accounts for variations in the static infrastructure when generating the static context, the variations being from one or more of weather, temporary obstructions, and traffic to identify irregularities that affect the nearby vehicle.

10. The non-transitory computer-readable medium of claim 9, wherein the static infrastructure elements of the roadway segment comprising at least lane markings, curbs poles.

11. The non-transitory computer-readable medium of claim 10, wherein the instructions to communicate the roadway context include instructions to communicate the static context to the nearby vehicle to facilitate background subtraction and identification of dynamic objects by the nearby vehicle when the nearby vehicle is within an area of the roadway segment.

12. The non-transitory computer-readable medium of claim 9, wherein the instructions to analyze the sensor data include instructions to generate a dynamic context as part of the roadway context to characterize dynamic objects and dynamic infrastructure elements associated with the roadway segment including at least pedestrians, other vehicles, and construction infrastructure, and
wherein the instructions include instructions to execute the learning module to process the sensor data according to a learned understanding about the dynamic objects and the dynamic infrastructure that occur in relation to the roadway segment including behaviors of the dynamic objects observed over successive observations of the roadway segment in relation to different times.

13. The non-transitory computer-readable medium of claim 12, wherein the instructions to analyze the sensor data include instructions to generate the dynamic context for the nearby vehicle to indicate a selected level of granularity about the dynamic objects according to at least abilities of the nearby vehicle,
wherein the dynamic context indicates at least positions of the dynamic objects in relation to the nearby vehicle and trajectories of the dynamic objects,
wherein the instructions to communicate the roadway context include instructions to communicate the dynamic context to the nearby vehicle to facilitate the contextual awareness of the nearby vehicle about the dynamic objects, and wherein the instructions include instructions to analyze the sensor data using the learning module to account for irregularities associated with the dynamic objects and dynamic infrastructure at the roadway segment that affect the nearby vehicle.

14. A method of providing contextual awareness about a roadway segment from an infrastructure device, comprising:
in response to receiving a context request from a nearby vehicle, acquiring sensor data from at least one infrastructure sensor associated with the roadway segment;
analyzing the sensor data to produce a roadway context by executing a learning module over the sensor data, wherein the roadway context is a characterization of a current state of the roadway segment, wherein executing the learning module include instructions to process the sensor data according to a learned understanding about the roadway segment, wherein the learning module is a machine learning algorithm that generates the learned understanding over successive observations of the roadway segment and in relation to different times and configurations of the roadway segment; and
communicating the roadway context to the nearby vehicle to improve a situational awareness of the nearby vehicle about the roadway segment, wherein analyzing the sensor data includes generating a static context as part of the roadway context to characterize a background of the roadway segment that includes static infrastructure elements of the roadway segment, and
wherein the learning module accounts for variations in the static infrastructure when generating the static context, the variations being from one or more of weather, temporary obstructions, and traffic to identify irregularities that affect the nearby vehicle.

15. The method of claim 14, wherein the static infrastructure elements of the roadway segment including at least lane markings, curbs, and poles.

16. The method of claim 15, wherein communicating the roadway context includes communicating the static context to the nearby vehicle to facilitate background subtraction and identification of dynamic objects by the nearby vehicle when the nearby vehicle is within an area of the roadway segment.

17. The method of claim 14, wherein analyzing the sensor data includes generating a dynamic context as part of the roadway context to characterize dynamic objects and dynamic infrastructure elements associated with the roadway segment including at least pedestrians, other vehicles, and construction infrastructure, and
wherein executing the learning module processes the sensor data according to a learned understanding about the dynamic objects and the dynamic infrastructure that occur in relation to the roadway segment including behaviors of the dynamic objects observed over successive observations of the roadway segment in relation to different times.

18. The method of claim 17, wherein analyzing the sensor data includes generating the dynamic context for the nearby vehicle to indicate a selected level of granularity about the dynamic objects according to at least abilities of the nearby vehicle,
wherein the dynamic context indicates at least positions of the dynamic objects in relation to the nearby vehicle and trajectories of the dynamic objects,
wherein communicating the roadway context includes communicating the dynamic context to the nearby vehicle to facilitate the contextual awareness of the nearby vehicle about the dynamic objects, and wherein analyzing the sensor data by the learning module accounts for irregularities with the dynamic objects and dynamic infrastructure at the roadway segment that affect the nearby vehicle.

19. The method of claim 14, further comprising:
training the learning module to generate a learned understanding as part of the learning module that characterizes the roadway segment through observations of the roadway segment and occurrences of events within the roadway segment according to correlations between the occurrences, times associated with the occurrences, and dynamic objects present during the occurrences,
wherein analyzing the sensor data includes generating the roadway context as a multi-level contextual assessment of the roadway segment for a current time associated with the sensor data, and wherein the roadway segment is an intersection of two separate roads.

20. The method of claim 14, wherein communicating with the nearby vehicle includes receiving information from the nearby vehicle including one or more of information from a sensor of the nearby vehicle, and an assessment of the roadway context, wherein the assessment correlates information in the roadway context with observations of the nearby vehicle to provide feedback about the roadway context,
wherein communicating includes generating communications transmitted to the nearby vehicle according to a vehicle-to-infrastructure (V2I) protocol, and
wherein acquiring the sensor data includes acquiring observations from one or more sensors that are statically mounted at the roadway segment to observe the roadway segment and communicate the sensor data to the infrastructure device.

* * * * *